(12) United States Patent
Yamashiro et al.

(10) Patent No.: US 10,448,347 B2
(45) Date of Patent: Oct. 15, 2019

(54) COMMUNICATION DEVICE

(71) Applicant: DENSO CORPORATION, Kariya, Aichi-pref. (JP)

(72) Inventors: Takahisa Yamashiro, Kariya (JP); Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/744,354

(22) PCT Filed: Aug. 22, 2016

(86) PCT No.: PCT/JP2016/074318
§ 371 (c)(1),
(2) Date: Jan. 12, 2018

(87) PCT Pub. No.: WO2017/047325
PCT Pub. Date: Mar. 23, 2017

(65) Prior Publication Data
US 2018/0213497 A1    Jul. 26, 2018

(30) Foreign Application Priority Data
Sep. 17, 2015  (JP) .................. 2015-184275

(51) Int. Cl.
*H04W 56/00* (2009.01)
*H04L 7/00* (2006.01)
*H04W 4/40* (2018.01)

(52) U.S. Cl.
CPC ....... *H04W 56/0005* (2013.01); *H04L 7/0012* (2013.01); *H04W 56/006* (2013.01); *H04W 56/0015* (2013.01); *H04W 4/40* (2018.02)

(58) Field of Classification Search
CPC ..... H04W 4/04; H04W 4/40; H04W 56/0015; H04W 56/0005; H04W 56/006; H04W 56/00; H04L 7/0012; H04L 7/00
(Continued)

(56) References Cited

U.S. PATENT DOCUMENTS 8,797,938 B2 *  8/2014  Kim ................... H04W 72/005
                                                            370/312
9,225,782 B2 * 12/2015  Addepalli ............ H04W 4/046
(Continued)

FOREIGN PATENT DOCUMENTS

JP       2011120231 A     6/2011

*Primary Examiner* — Man U Phan
(74) *Attorney, Agent, or Firm* — Harness, Dickey & Pierce, P.L.C.

(57) ABSTRACT

A communication device includes: a time zone determiner section that identifies a switching point of time of communication time zones based on a clock time and determines whether the communication time zones are switched based on the clock time and the switching point of time; a channel switch section that designates a communication-target channel by switching the communication time zones at the identified switching point of time; a transmission processor section that performs a data transmission using the communication-target channel designated, and prohibits data transmission from being performed for a predetermined transmission prohibition duration time before and after the switching point of time; an error assessor section that assesses an error amount that is a degree of an error of the clock time against the reference clock time; and a transmission prohibition-time adjuster section that increases the transmission prohibition duration time as the error amount increases.

13 Claims, 6 Drawing Sheets

(58) Field of Classification Search
USPC .......................................................... 370/350
See application file for complete search history.

(56) References Cited

U.S. PATENT DOCUMENTS

| | | | |
|---|---|---|---|
| 9,503,968 B2* | 11/2016 | Nathanson | G07C 5/0808 |
| 9,888,358 B2* | 2/2018 | Yamashiro | H04W 4/04 |
| 9,924,452 B2* | 3/2018 | Nathanson | G07C 5/0808 |
| 10,187,767 B2* | 1/2019 | Nathanson | H04W 12/04 |
| 2011/0128849 A1* | 6/2011 | Guo | H04W 28/10 |
| | | | 370/235 |
| 2017/0345231 A1* | 11/2017 | Kumabe | H04W 4/04 |
| 2018/0027388 A1* | 1/2018 | Kumabe | H04W 4/04 |
| | | | 705/39 |
| 2018/0279068 A1* | 9/2018 | Yamashiro | H04W 4/02 |

* cited by examiner

| ERROR AMOUNT | GI DURATION TIME |
|---|---|
| SMALL | Ta |
| GREAT | Tb |

COMMUNICATION DEVICE

CROSS REFERENCE TO RELATED APPLICATIONS

This application is a U.S. National Phase Application under 35 U.S.C. 371 of International Application No. PCT/JP2016/074318 filed on Aug. 22, 2016 and published in Japanese as WO 2017/047325 A1 on Mar. 23, 2017. This application is based on and claims the benefit of priority from Japanese Patent Application No. 2015-184275 filed on Sep. 17, 2015. The entire disclosures of all of the above applications are incorporated herein by reference.

TECHNICAL FIELD

The present disclosure relates to a communication device in a mobile communication system in which a plurality of the communication devices used in a plurality of mobile objects perform direct wireless communication.

BACKGROUND ART

As disclosed in Patent literature 1, there is known WAVE (Wireless Access in Vehicular Environments) as a telecommunication standard used for a communication device (in-vehicle device, hereinafter) used in a vehicle to perform direct communication with a different communication device. A communication partner for a subject in-vehicle device includes a different in-vehicle device or a communication device (roadside device, hereinafter) present in a road. The roadside device performs direct communications with the subject in-vehicle device, providing a predetermined service to an occupant of a host vehicle using the subject in-vehicle device.

WAVE specifies two kinds of communication channels of a control channel (CCH, hereinafter) and a service channel (SCH, hereinafter); two kinds of communication channels are used for respective communication devices to perform direct communication. An SCH is a communication channel used for transmission and reception of the information for providing and enjoying services; a CCH is a communication channel used for transmission and reception of the information for starting the communication using an SCH.

Further, WAVE designates alternately a CCH time zone for communication using the CCH and an SCH time zone for communication using the SCH, with predetermined time intervals (each 50 milliseconds, for instance).

Each communication device designates basically the CCH as a communication channel (communication-target channel) being a transmission/reception target to perform the communication using the CCH while the current clock time is within the CCH time zone. In performing the communication using an SCH, the communication-target channel is switched from the CCH to an intended SCH at the point of time when the CCH time zone transitions into the SCH time zone. At the point of time when the SCH time zone is completed, the communication-target channel is returned to the CCH.

Whether the current clock time is within the CCH time zone or the SCH time zone is determined for each communication device based on the clock time information held in each communication device. There may be arising an error in clock time information between a transmitting device that is a communication device going to transmit data and a receiving device that is a communication device going to receive the data. Such a case involves an error in the point of time for switching the communication-target channel, possibly posing a communication failure. This communication failure signifies an event that causes a receiving device to fail to receive the data transmitted by a transmitting device.

In order to suppress such an error in the clock time information, each in-vehicle device performs a synchronization process to synchronize the clock time information held by itself with a predetermined reference clock time, using a PPS signal (PPS: Pulse Per Second) outputted each second from a GNSS receiver or a TA frame (TA: Timing Advertisement) distributed from a roadside device to advertise the point of time when the seconds change from a previous second to a new second.

This GNSS receiver is a device receiving the radio waves from GNSS satellites used in a well-known global navigation system (GNSS, hereinafter). The GNSS receiver receiving the radio waves from GNSS satellites outputs a PPS signal each second.

In addition, WAVE specifies a guard interval that is a time zone for prohibiting the transmission of data, before and after the point of time when the communication time zone such as the SCH time zone and the CCH time zone switches. This is because just before or just after the point of time when the communication time zone switches, the respective communication-target channels in a transmitting device and a receiving device may fail to accord with each other, due to the errors in the clock time information held by each communication device.

PRIOR ART LITERATURES

Patent Literature

Patent literature 1: US 2011/0128849 A1

SUMMARY OF INVENTION

The duration time of a guard interval is conventionally specified to be a fixed time length of about ½s of the CCH time zone or the SCH time zone (for example, 2 milliseconds). Under such a conventional technology, if an error of a clock time held by each communication device against a reference clock time (a synchronization error amount, hereinafter) is shorter than the duration time of the fixed guard interval, the communication is less likely to pose a communication failure due to the error in clock time information.

However, the synchronization error amount is not always less than the duration time of the fixed guard interval. For example, an accuracy of the clock time information acquired by a synchronization process using a TA frame is relatively lower than that of the clock time information acquired by a synchronization process based on a PPS signal. Executing a synchronization process using a TA frame may cause the synchronization error amount to exceed the length of guard interval.

As a matter of course, it is desirable that each in-vehicle device executes a synchronization process using a PPS signal providing relatively high accuracy; however, an in-vehicle device is not always present in the environment allowing acquisition of the PPS signal. An environment such as a tunnel, which poses a GNSS receiver to fail to receive the radio waves from GNSS satellites, disables the execution of the synchronization process using the PPS signal.

In addition, if not present adjacent to any service providing terminal, an in-vehicle device fails to execute a synchronization process using the TA frame. That is, an in-vehicle device may be assumed to be sometime present in an environment disabling any synchronization process to be executed. Naturally, when such an in-vehicle device is present in an environment that disables any synchronization process to be executed, the synchronization error amount increases as an elapsed time increases since the execution of the last synchronization process.

That is, the kind of information used for a synchronization process, or the elapsed time after executing the last synchronization process performed most recently may cause the synchronization error amount to exceed the duration time of the guard interval specified previously. Suppose that a synchronization error amount is longer than the fixed length of the guard interval and thus is not solved by the guard interval. Such a case may pose the mismatching in the communication-target channels between a transmitting device and a receiving device, increasing a possibility of communication failure.

It is an object of the present disclosure to provide a communication device reducing a possibility of communication failure due to errors in clock time information held by the communication device.

According to an aspect of the present disclosure to achieve the above object, a communication device as one of a plurality of communication devices used in a mobile communication system is provided as follows. The communication devices perform direct wireless communication using a control channel and a service channel among communication channels that are achieved with mutually different frequencies. Communication time zones of a control channel time zone and a service channel time zone are alternately switched. The control channel time zone is where communication is performed using the control channel; the service channel time zone is where communication is performed using the service channel. The communication device includes: a time holder section that holds a clock time at present based on a clock signal outputted successively from a clock generator; a synchronization information acquirer section that acquires synchronization information used to synchronize the clock time held in the time holder with a predetermined reference clock time; a time amender section that performs amendment that amends the clock time held in the time holder section to decrease an error between the clock time held in the time holder section and the reference clock time based on the synchronization information; a time zone determiner section that identifies a switching point of time at which the communication time zones are switched based on the clock time held in the time holder section, and determines whether the communication time zones are switched based on the switching point of time and the clock time held in the time holder section; a channel switching section that designates a communication-target channel being a channel for a communication target by switching the communication time zones at the switching time identified by the time zone determiner section; a transmission processor section that performs a data transmission using the communication-target channel designated by the channel switching section, and prohibits data transmission from being performed for a predetermined transmission prohibition duration time before and after the switching point of time; an error assessor section that assesses an error amount being a degree of the error between the clock time held in the time holder section and the reference clock time; and a transmission prohibition-time adjuster section that adjusts the transmission prohibition duration time depending on the error amount assessed by the error assessor section. Herein, the transmission prohibition-time adjuster section increases the transmission prohibition duration time as the error amount assessed by the error assessor section increases.

Under the above configuration, the error assessor section assesses an error amount of the clock time held by the time holder section against the reference clock time; the transmission prohibition-time adjuster section increases the transmission prohibition duration time as the error amount assessed by the error assessor section increases. Further, the transmission processor section prohibits data transmission from being performed for a predetermined transmission prohibition duration time before and after the switching point of time identified by the time zone determiner section. That is, even if the time zone determiner section determines that the communication time zones are switched, the transmission processor section does not transmit the data immediately but transmits the data after the transmission prohibition time elapses.

According to the above configuration, as the error amount assessed by the error assessor is greater, the transmission processor section increases a time interval from when the communication time zones are determined to be switched by the time zone determiner section to when the data transmission is started. In other words, the data transmission is allowed to be performed around a middle point in the communication time zone.

Just before and just after the communication time zones are switched, there is a relatively high possibility of mismatching in the communication-target channels between a transmitting device and a receiving device. By contrast, in an intermediate portion in the communication time zone, there is a high possibility of matching in the communication-target channels between a transmitting device and a receiving device. This is because such mismatching in the communication-target channels due to an error in the clock time information in each communication device is expected to be solved in an intermediate portion in the communication time zone.

The above configuration can thus reduce a possibility of the failure in the communication due to the error in the clock time information held by a communication device.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
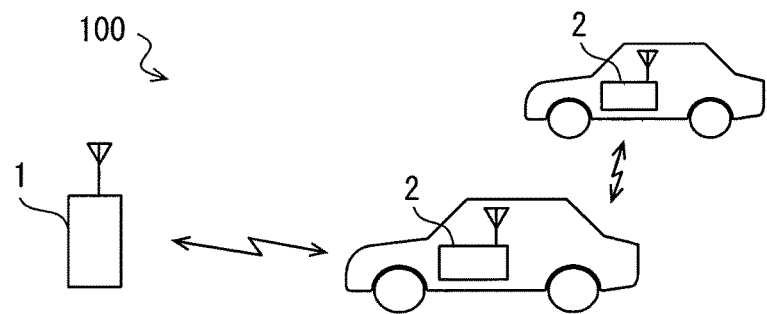
FIG. 1 is a diagram illustrating a schematic configuration of a mobile communication system according to an embodiment.

The following explains an embodiment of the present disclosure with reference to drawings. FIG. 1 is a block diagram illustrating an example of a schematic configuration of a mobile communication system 100 according to the present embodiment. As in FIG. 1, the mobile communication system 100 includes a roadside device 1 that is a communication device managed by a predetermined service provider, and a plurality of in-vehicle devices 2 that are communication devices used in respective vehicles, each of which may be also referred to as a host vehicle. The present embodiment refers to a host vehicle mounted with a subject in-vehicle device 2 as a subject vehicle, and refers to a different host vehicle mounted with a different in-vehicle device 2 as a different vehicle.

The above service provider signifies an entity such as company, shop, public institution, which provides a predetermined service to users using the in-vehicle device 2. FIG. 1 illustrates only a single roadside device 1; however, a plurality of roadside devices 1 may be included.

<Schematic Configuration of Mobile Communication System 100>

The roadside device 1 and the in-vehicle devices 2 are configured to perform direct wireless communication in compliance with a standard of WAVE (Wireless Access in Vehicular Environment). The wireless communication in compliance with the standard of WAVE will be referred to as WAVE communication, for convenience.

WAVE assigns communication channels including one control channel and a plurality of service channels (e.g., six service channels). The control channel and the service channels are achieved with mutually different frequencies. Note that the control channel and the service channels may be achieved with the frequencies belonging to 5.8 GHz band, 5.9 GHz band, and/or 2.4 GHz band. Frequencies belonging to other frequency bands may be also employed.

The service channel is a communication channel used in order that a roadside device 1 and an in-vehicle device 2 may transmit and receive the information for providing and using a service, respectively. In addition, the service channel is also a communication channel used in order that the in-vehicle devices 2 perform well-known vehicle-to-vehicle communication. The service channels are assigned with respective unique numbers (hereinafter, channel numbers); each service channel only needs to be distinguished by using the assigned channel number. Note that "information," which may be used not only as an uncountable noun but also a countable noun, is equivalent to an information item. One information is equivalent to one information item; a plurality of informations are equivalent to a plurality of information items. Further, "data" is used also as one data or a plurality of data. One data is equivalent to one data item; a plurality of data are equivalent to a plurality of data items.

The control channel is a communication channel used, e.g., for a roadside device 1 to distribute a WSA (Wave Service Advertisement) that is a message for starting the communication using a predetermined service channel with an in-vehicle device 2. Such a WSA includes the service kind information that indicates a kind of service provided by the roadside device 1, and the channel information that identifies a service channel used to provide the service from among a plurality of service channels.

Figure 2:
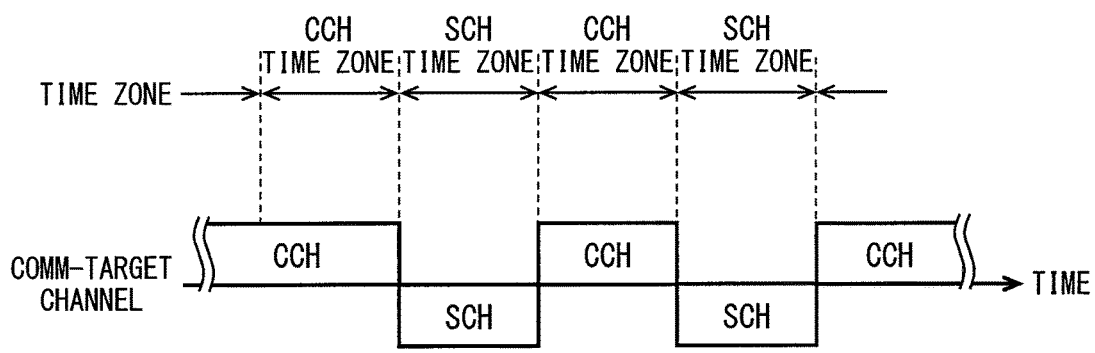
FIG. 2 is a schematic diagram for explaining communication time zones.

In addition, as in FIG. 2, the WAVE specifies a CCH time zone and an SCH time zone; two time zones are switched alternately with predetermined time intervals. The CCH time zone is a time zone for which the communication using the control channel is performed; the SCH time zone is a time zone for which the communication using the service channel is performed. In the present embodiment, as one example, the CCH time zone and the SCH time zone may be switched alternately therebetween every 50 milliseconds.

Note that CCH represents Control CHannel; SCH represents Service CHannel. A communication time zone may be also used when the CCH time zone and the SCH time zone need to be not distinguished from each other. The CCH time zone is equivalent to a control channel time zone; the SCH time zone is equivalent to a service channel time zone.

The in-vehicle device 2 is configured to be unpermitted to use a plurality of communication channels at the same time. The in-vehicle device 2 designates a communication channel for transmission-reception target (which will be referred to as a communication-target channel) by selecting one channel in sequence from a plurality of communication channels specified in the WAVE, performing the communication using the control channel or the communication using the service channels.

The roadside device 1 is configured to be permitted to use at the same time only a single communication channel among a plurality of communication channels as a communication-target channel, like the in-vehicle device 2. However, another embodiment may be provided with another configuration permitting the roadside device 1 to use a plurality of communication channels at the same time.

In the WAVE, each communication device designates the control channel as a communication-target channel while the current clock time is determined to be within the CCH time zone. That is, the communication using the control channel is performed while determining that current clock time is within the CCH time zone.

In addition, when needing to perform the communication using a predetermined service channel, each communication device designates, as the communication-target channel, a corresponding service channel by switching from the control channel at the point of time when the CCH time zone transitions into the SCH time zone. Then, at the point of time at which the SCH time zone is completed, the communication-target channel is returned from the service channel to the control channel.

Note that the case of the in-vehicle device 2 needing to perform the communication using a predetermined service channel includes the case of using a service provided by the roadside device 1, or the case of performing the vehicle-to-vehicle communication with a different in-vehicle device 2 present in the vicinity. Further, when not needing to perform the communication using any service channel, the in-vehicle device 2 may continue designating the control channel as the communication-target channel even in the SCH time zone.

Each communication device is assigned with an identification code (hereinafter, a device ID) for identifying each of a plurality of communication devices. In addition, such a device ID of a communication device is included in a data transmitted by the communication device serving as a transmitting device; a communication device receiving the data can identify the transmitting device by using the device ID included in the data.

<Configuration of Roadside Device 1>

The following explains a configuration and an operation of the roadside device 1. The roadside device 1 transmits a TA frame (TA: Timing Advertisement) which advertises, each second, the switching in units of seconds in a reference clock time to be explained later. This TA frame is the information for synchronizing the clock time held in the in-vehicle device 2 with the reference clock time. The TA frame may be transmitted using the control channel. The TA frame is equivalent to a timing advertisement signal.

The roadside device 1, which executes road-to-vehicle communication with an in-vehicle device 2 that is present in a wireless communication area formed by the roadside device 1, executes a predetermined service by transmitting a variety of information to the in-vehicle device 2 and acquiring a variety of information from the in-vehicle device 2.

The services provided by the roadside device 1 include an automatic fee collection service during running a toll road, an automatic parking fee collection service at parking, a traffic information distribution service, a position information report service, and advertisings distribution service.

The roadside device 1 may be movable or fixed in a roadside. In addition, the roadside device 1 may be mounted in a mobile object such as a vehicle. The roadside device 1 is installed in a position suitable for a service provided by the roadside device 1 itself. For example, the roadside device 1 may be installed at a position according to the kind of service provided, such as a gateway for a parking lot or a toll road. The wireless communication area, which is determined according to the output of radio waves transmitted from the roadside device 1, may be specified based on a service provided by the roadside device 1.

Figure 3:
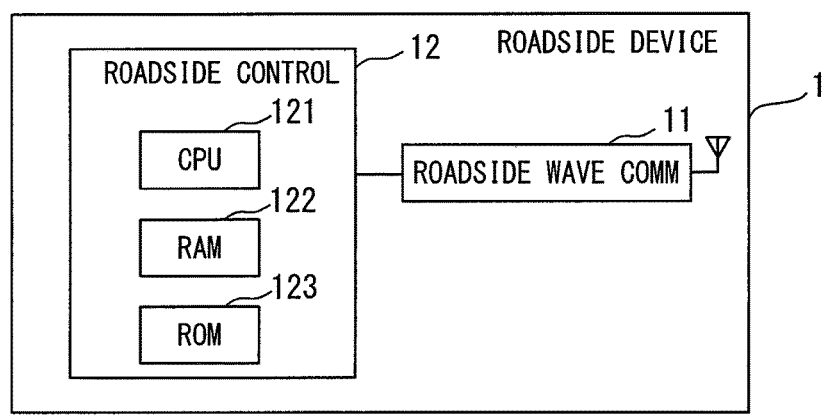
FIG. 3 is a diagram illustrating an example of a schematic configuration of a roadside device.

The roadside device 1 includes a roadside WAVE communicator 11, and a roadside control circuit 12 as in FIG. 3. The roadside WAVE communicator 11 and the roadside control circuit 12 are connected to communicate with each other.

The roadside WAVE communicator 11 executes WAVE communication with an in-vehicle device 2 that is present in a wireless communication area formed by the roadside WAVE communicator 11. The roadside WAVE communicator 11, which includes an antenna for performing WAVE communication, demodulates a signal received via the antenna and outputs it to the roadside control circuit 12 while modulating a data inputted from the roadside control circuit 12, converting to the radio waves to transmit.

This roadside WAVE communicator 11 is configured to be able to designate a communication-target channel by selecting one channel through switching among the communication channel and the service channels. That is, both the communication using the control channel and the communication using the service channel with the in-vehicle device 2 are performed via the roadside WAVE communicator 11.

The roadside WAVE communicator 11 detects the changes of the communication zones based on the clock time information held in the roadside device 1 itself, and switches the communication-target channel. Note that the service channel designated as a communication-target channel from the plurality of service channels is indicated from the roadside control circuit 12.

The roadside control circuit 12 is configured to be a computer to include a CPU 121, a RAM 122, a ROM 123, an I/O, and a bus line that connects the foregoing components. The ROM 123 stores a program (roadside-device program, hereinafter) that makes a usual computer function as the roadside control circuit 12 in the present embodiment, and a device ID that is assigned to the roadside device 1. In addition, the ROM 123 further stores the information for generating a WSA.

The roadside control circuit 12 executes the various processes corresponding to the above-mentioned roadside-device program. All or part of the functions provided by the roadside control circuit 12 may be configured as hardware components such as one or more ICs.

The roadside control circuit 12 generates the data for the roadside WAVE communicator 11 to transmit, and controls the roadside WAVE communicator 11 to transmit the generated data via the communication channel corresponding to the generated data. For example, the roadside control circuit 12 allows the transmission of a WSA via the control channel, when generating the WSA.

In addition, the roadside control circuit 12 allows the transmission of a TA frame that advertises the switching in units of seconds in a reference clock time for each second. This TA frame is the information for synchronizing the clock time held in the in-vehicle device 2 with a predetermined reference clock time. This TA frame is equivalent to an example of the synchronization information.

This reference clock time indicates a clock time that each communication device needs to hold primarily. For instance, a reference clock time is a clock time (hereinafter, GNSS clock time) used in global navigation satellite system (hereinafter, GNSS), but not limited thereto. The reference clock time may be a universal time, coordinated (UTC). Furthermore, it may be a clock time system uniquely defined in the mobile communication system 100. Communication devices performing WAVE communication with each other only need to use common clock time information. Therefore, the clock time held by a certain roadside control circuit 12 may be defined as a reference clock time in the vicinity of the certain roadside control circuit 12.

The roadside control circuit 12 may be configured to receive the information indicating a correct reference clock time from a server provided in an outside entity. In addition, the roadside control circuit 12 may be configured to include a GNSS receiver used in GNSS to thereby acquire a reference clock time. This is because the GNSS receiver receives radio waves transmitted from the satellites (hereinafter, GNSS satellites) used in GNSS, and thereby acquires a GNSS clock time. The GNSS satellite is equivalent to a positioning satellite.

<Relating to in-Vehicle Device 2>

The following explains a configuration and an operation of the in-vehicle device 2. The vehicle using the in-vehicle device 2 corresponds to various types of vehicles running roads such as a passenger car, a bus, a truck. FIG. 1 illustrates a four-wheel vehicle; however, the vehicle may be two-wheel vehicle or three-wheel vehicle. The two-wheel vehicle may include a bicycle.

The in-vehicle device 2 according to the present embodiment is provided in a configuration of being mounted in a vehicle; however, it may be provided in another configuration of being brought into a vehicle by a user. The mode of being mounted in a vehicle includes not only the mode of being assembled into the vehicle but also the configuration of being removably attached to a holder installed in the vehicle.

The in-vehicle device 2 may operate based on the electric power provided from an electric power source mounted in a subject vehicle being a host vehicle, such as an ignition power source (hereinafter, IG power) or in-vehicle battery.

Figure 4:
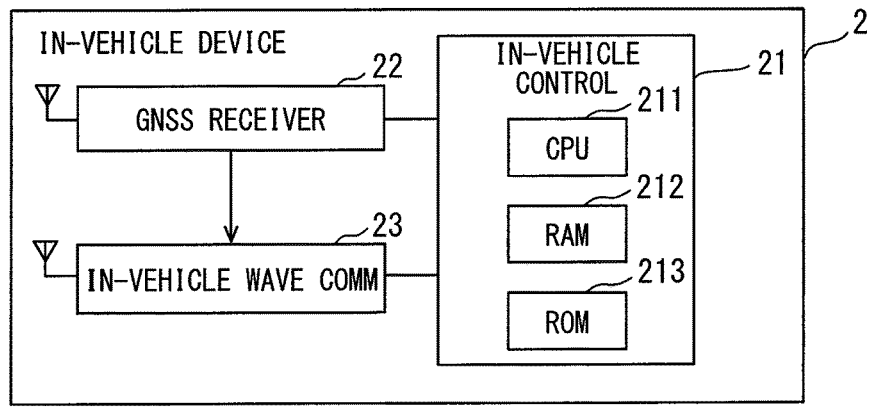
FIG. 4 is a diagram illustrating an example of a schematic configuration of an in-vehicle device.

This in-vehicle device 2 includes the in-vehicle control circuit 21, the GNSS receiver 22, and the in-vehicle WAVE communicator 23, as illustrated in FIG. 4. The in-vehicle control circuit 21 is connected to communicate with each of the GNSS receiver 22 and the in-vehicle WAVE communicator 23, controlling overall operations of the in-vehicle device 2. The details of the in-vehicle control circuit 21 will be explained later.

The GNSS receiver 22 is a receiver to receive the radio waves from the above-mentioned GNSS satellites. The GNSS receiver 22, which contains internally a clock (hereinafter, internal clock), receives the radio waves from the GNSS satellites to thereby synchronize the internal clock with the GNSS clock time. In details, positioning computing is executed based on the radio waves from the GNSS satellites. The exact GNSS clock time is specified as a result of the positioning computing.

In addition, the GNSS receiver 22 outputs a PPS signal (PPS: Pulse Per Second) to the in-vehicle WAVE communicator 23 each second in the state of capturing a GNSS satellite. The PPS signal functions as a signal indicating the right time (timing) of a second in whole integer without decimals, namely, the point of time when the previous second is switched to the new second. This PPS signal is equivalent to the reference timing information, and equivalent to an example of the synchronization information. In addition, the GNSS receiver is equivalent to a positioning radio receiver.

The GNSS receiver 22 is configured to execute the positioning computing process based on the received radio waves in the present embodiment, but it is not limited thereto. The positioning computing process may be executed by the in-vehicle control circuit 21 and/or the in-vehicle WAVE communicator 23. In this case, the functional module executing the positioning computing only needs to provide a synchronization information acquirer section F3 (to be explained later) with the information (reference timing information) that indicates the point of time when the previous second is switched to the new second in the GNSS clock time, as a result of the positioning computing.

The in-vehicle WAVE communicator 23, which includes an antenna for performing WAVE communication, demodulates a signal received via the antenna and outputs it to the in-vehicle control circuit 21 while modulating a data inputted from the in-vehicle control circuit 21, converting to the radio waves to transmit.

This in-vehicle WAVE communicator 23 is configured to be able to designate a communication-target channel by selecting one channel from the control channel and the service channels. That is, both the communication using the control channel and the communication using the service channel are performed via the in-vehicle WAVE communicator 23.

A channel control mode, which is a mode for the in-vehicle WAVE communicator 23 to control a communication-target channel, is advertised from the roadside control circuit 12. The channel control mode includes a channel alternating mode and a channel holding mode. The channel alternating mode is to designate, as a communication-target channel, the communication channels alternately according to the transitions between the communication time zones. The channel holding mode is to designate, as a communication-target channel, the communication channel indicated by the in-vehicle control circuit 21 without depending on the transitions between the communication time zones.

When employing the channel alternating mode as the channel control mode, the in-vehicle WAVE communicator 23 detects the changes of the communication zones based on the clock time information held in the in-vehicle WAVE communicator 23 itself, and switches the communication-target channel. Note that the service channel designated as a communication-target channel in the SCH time zone from the plurality of service channels is indicated by the in-vehicle control circuit 21.

The communication channel designated as a communication-target channel in the channel holding mode is also indicated by the in-vehicle control circuit 21. The detailed configuration of this in-vehicle WAVE communicator 23 will be described later.

The in-vehicle control circuit 21 is also referred to as an in-vehicle electronic control unit. The present embodiment configures, as one example, the in-vehicle control circuit 21 to be a computer to include a CPU 211, a RAM 212, a ROM 213, an I/O, and a bus line that connects the foregoing components. The ROM 213 stores a program (vehicular program, hereinafter) that makes a usual computer function as the in-vehicle control circuit 21 in the present embodiment, and a device ID that is assigned to the in-vehicle device 2.

Note that the above-mentioned vehicular program only needs to be stored in a non-transitory tangible storage medium such as ROM. Executing the vehicular program by the CPU 211 corresponds to executing a method corresponding to the vehicular program.

Figure 5:
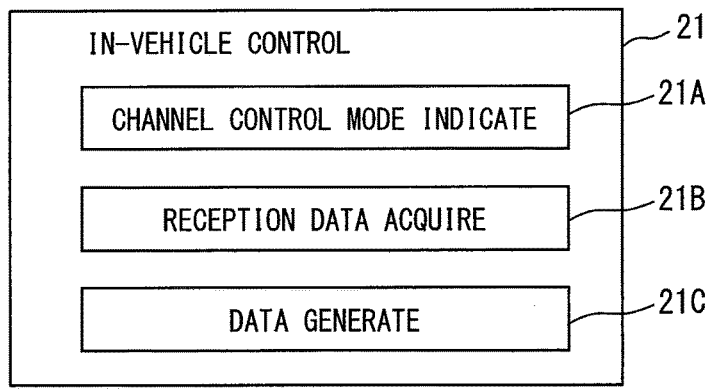
FIG. 5 is a diagram illustrating an example of a schematic configuration of an in-vehicle control circuit.

The in-vehicle control circuit 21 includes, as in FIG. 5, a channel control mode indicator section 21A, a reception data acquirer section 21B, and a data generator section 21C (which are also referred to as a channel control mode indicator 21A, a reception data acquirer 21B, and a data generator 21C), as the functional blocks achieved when the in-vehicle control circuit 21 executes the above-mentioned vehicular program. All or part of the functions provided by the in-vehicle control circuit 21 may be configured as hardware components such as one or more ICs.

The channel control mode indicator section 21A determines the channel control mode that the in-vehicle WAVE communicator 23 will execute, and indicates it to the in-vehicle WAVE communicator 23. For example, the channel control mode indicator section 21A indicates that the execution of vehicle-to-vehicle communication needs to employ the channel alternating mode. In contrast, the channel control mode indicator section 21A indicates that the use of a service provided by the roadside device 1 needs to employ either the channel alternating mode or the channel holding mode designating a predetermined service channel as a communication-target channel.

The condition for executing vehicle-to-vehicle communication, or the condition for using a service provided by the roadside device 1 may be designed suitably. The service channel employed as a communication-target channel when using a service provided by the roadside device 1 corresponds to the service channel identified in the WSA having advertised this service.

The reception data acquirer section 21B acquires the data that the in-vehicle WAVE communicator 23 receives. For example, the reception data acquirer section 21B acquires a WSA transmitted by the roadside device 1 or a data transmitted from a different vehicle via vehicle-to-vehicle communication.

The data generator section 21C generates the data that the in-vehicle WAVE communicator 23 will transmit, based on the data stored in the ROM 213, or based on the data acquired by the reception data acquirer section 21B, and transmits the generated data to the in-vehicle WAVE communicator 23 via a predetermined communication channel.

In detail, the channel information indicates a communication-target channel that needs to be designated to transmit a data. The generated data is attached with such channel information and then outputted to the roadside WAVE communicator 11. This allows the transmission of the generated data via the intended communication channel.

Note that the in-vehicle control circuit 21 is configured to use the clock time information that is common to that of the in-vehicle WAVE communicator 23. The point of time of generating a data may be adjusted by the clock time information. For example, the data for transmitting to a different in-vehicle device 2 via vehicle-to-vehicle communication may be generated within the SCH time zone.

<Relating to in-Vehicle WAVE Communicator 23>

Figure 6:
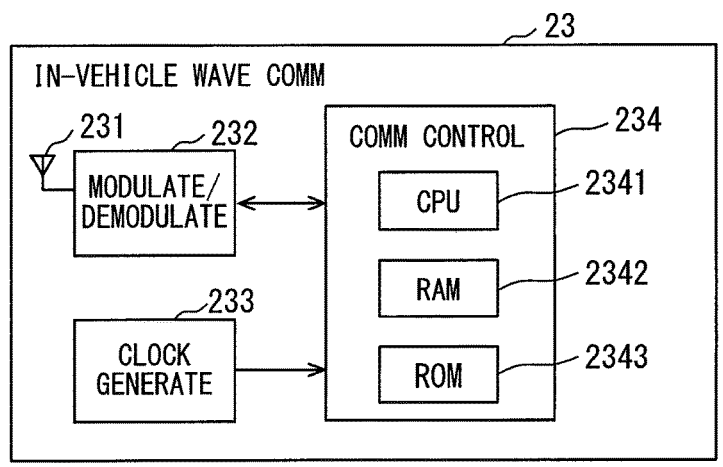
FIG. 6 is a diagram illustrating an example of a schematic configuration of an in-vehicle WAVE communicator.

The following explains a configuration of the in-vehicle WAVE communicator 23. The in-vehicle WAVE communicator 23 includes, as in FIG. 6, an antenna 231, a modulator and demodulator 232, a clock generator 233, and a communication control circuit 234. The modulator and demodulator 232 is connected to communicate with each of the antenna 231 and the communication control circuit 234.

The antenna 231 is an antenna for transmitting and receiving the radio waves with a frequency band used in WAVE communication. The antenna 231 provides a reception signal to the modulator and demodulator 232. In addition, the antenna 231 converts an electrical signal inputted from the modulator and demodulator 232 into the radio wave with the frequency corresponding to the communication-target channel and emits the radio wave to space.

The modulator and demodulator 232 applies predetermined signal processes to a reception signal inputted from the antenna 231 to thereby extract a data from the reception signal. The applied signal processes include a known demodulating process, analog to digital converting process, and decoding process. The extracted data is then provided to the communication control circuit 234.

In addition, the modulator and demodulator 232 applies predetermined processes to the baseband signal inputted from the communication control circuit 234, thereby generating a signal to the antenna 231. The applied signal processes include a coding process, digital-to-analog converting process, and modulating process. The signal after modulation (so-called the modulating signal) is a signal with the frequency corresponding to the communication-target channel.

Note that part or all of the functions included in the modulator and demodulator 232 may be achieved in a hardware manner by using, e.g., one IC or multiple ICs or in a software manner. Part or all of the functions included in the modulator and demodulator 232 may be included in the communication control circuit 234.

The clock generator 233 outputs successively a clock signal with a predetermined clock frequency (for example, 10 MHz). The clock generator 233 may be employed which has an intended operating frequency and a frequency precision. For example, the clock generator 233 may be served as by a crystal transmitter or a rubidium oscillator, for instance. In addition, a ceramic radiator or an LC oscillator may serve. The clock generator 233 outputs a clock signal to the communication control circuit 234.

The communication control circuit 234 may be also referred to as a communication electronic control unit. The present embodiment configures, as one example, the communication control circuit 234 to include a computer having a CPU 2341, a RAM 2342, a ROM 2343, an I/O. The ROM 2343 stores a program (hereinafter, communication control program) for making a usual computer function as the communication control circuit 234.

The above-mentioned communication control program only needs to be stored in a non-transitory storage media such as ROM. Executing the communication control program by the CPU 2341 corresponds to executing a method corresponding to the communication control program.

Figures 7, 8:
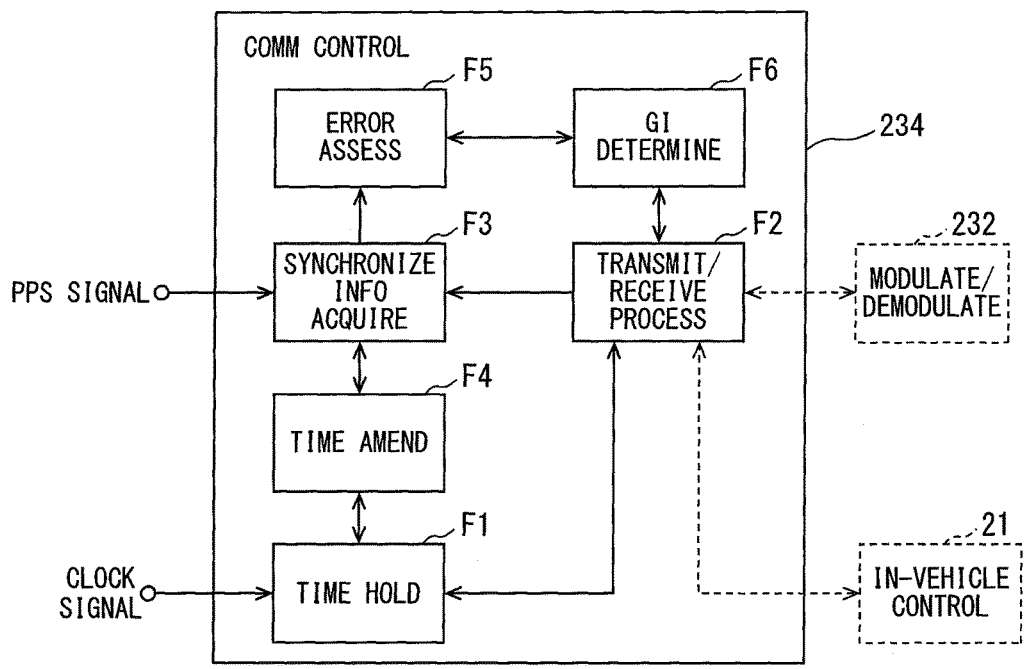
FIG. 7 is a diagram illustrating an example of a schematic configuration of a communication control circuit.
FIG. 8 is a diagram for explaining relation between GI duration time and error amount in vehicular clock time against reference clock time.

The communication control circuit 234 includes, as in FIG. 7, as in FIG. 7, a time holder section F1, a transmission and reception processor section F2, a synchronization information acquirer section F3, a time amender section F4, an error assessor section F5, and a guard interval determiner section F6 (which are also referred to as a time holder F1, a transmission and reception processor F2, a synchronization information acquirer F3, a time amender F4, an error assessor F5, and a guard interval determiner F6), as functional blocks achieved by executing the communication control program. All or part of the functions provided by the communication control circuit 234 may be configured as hardware components such as one or more ICs.

The time holder section F1 holds the clock time information which indicates the current clock time based on the clock signal inputted from the clock generator 233. The clock time (hereinafter, vehicular clock time) held by the time holder section F1 includes errors against the reference clock time. The errors include an error according to the kind of synchronization information used for the synchronization process mentioned later, or an error according to the elapsed time since the synchronization process is executed most recently and the frequency precision of the clock generator 233.

The vehicular clock time in the present embodiment is used in order to detect the changes of the communication time zones. In the present embodiment, the communication time zones change each 50 milliseconds as above-mentioned. Therefore, only clock time information held by the time holder section F1 may need to have only the information on units of seconds. In other words, the clock time information held by the time holder section F1 does not need to have the information on units of years, months, days, hours, or minutes.

The transmission and reception processor section F2 executes the processes for transmitting the data inputted from the in-vehicle control circuit 21, or providing the in-vehicle control circuit 21 with the reception data inputted from the modulator and demodulator 232. The details about this transmission and reception processor section F2 will be explained later.

The synchronization information acquirer section F3 acquires the synchronization information used in order to synchronize the vehicular clock time with the reference clock time. The synchronization information corresponds to a PPS signal outputted from the GNSS receiver 22 or a TA frame distributed from the roadside device 1. Other than the above information may be acquired as the synchronization information by the synchronization information acquirer section F3. The synchronization information only needs to be the information that accords the point of time when the number in units of seconds in the vehicular clock time is switched with the point of time when the number in units of seconds in the reference clock time is switched.

The time amender section F4 amends the clock time information so as to decrease an error difference between the vehicular clock time and the reference clock time by using the synchronization information acquired by the synchronization information acquirer section F3. This is also called the synchronization process.

The error difference between the point of time when a PPS signal is outputted and the reference clock time is typically significantly small. In addition, the accuracy becomes relatively higher as the duration time for continuing capturing the GPS radio wave becomes longer. The accuracy in the synchronization using the PPS signal is thus relatively high.

By contrast, the synchronization using the TA frame includes an error originating from the propagation of the TA frame. Such an error from the propagation originates from the time required in order that the radio wave corresponding to the TA frame propagates the space, or the time required for the signal processes such as demodulating or decoding. In addition, it may originate from the variation in the magnitude of the error from the propagation due to the propagation environment. The accuracy of the time synchronization using the TA frame is assumed to be inferior to that using the PPS signal.

The time amender section F4 in the present embodiment performs an amendment (i.e., synchronization process) of the vehicular clock time using the PPS signal when the PPS signal as the synchronization information has been able to be acquired each second. Further, the time amender section F4 performs an amendment (i.e., synchronization process) of the vehicular clock time also using the PPS signal when both the PPS signal and the TA frame have been able to be acquired each second.

That is, the time amender section F4 employs preferentially the PPS signal rather than the TA frame to perform the synchronization process. Naturally, when both the PPS signal and the TA frame are acquirable, another configuration may be provided which performs the synchronization process using the PPS signal and the TA frame complementarily. In addition, when the PPS signal cannot be received but the TA frame can be received, the synchronization process is executed using the TA frame.

The error assessor section F5 assesses the degree of error (hereinafter, error amount) of the vehicular clock time against the reference clock time depending on the kind of the synchronization information used for the synchronization process. In detail, when the previously performed synchronization process uses the PPS signal, the error amount is determined to be relatively small. In contrast, when the synchronization process performed immediately previously uses the TA frame, the error amount is determined to be relatively great.

In addition, when a synchronization process has not been able to be executed within a fixed duration time, the error amount is determined to be great. This fixed duration time is assumed to be a duration time for which any synchronization process has not been executed and the resultant error of the vehicular clock time against the reference clock time exceeds a first duration time Ta.

As an example, the error assessor section F5 is configured to assess an error amount in two levels of being great and being small, but is not limited thereto. For example, three levels may be used to assess. For instance, the error amount may be assessed to be great when failing to execute any synchronization process a fixed duration time or greater; the error amount may be assessed to be medium when executing a synchronization process using the TA frame within the fixed duration time; and the error amount may be assessed to be small when executing a synchronization process using the PPS signal within the fixed duration time.

In addition, as explained later, the error amount may be assessed using an elapsed time since the execution of the synchronization process. Note that the accuracy of the vehicular clock time is higher as the error amount is smaller; the accuracy of the vehicular clock time is lower as the error amount is greater.

The guard interval determiner section F6 determines the duration time of a guard interval depending on the error amount assessed by the error assessor section F5. This guard interval indicates a time zone in which the transmission of the information is prohibited before and after the point of time when the communication time zones are switched. Hereinafter, the guard interval may be abbreviated to GI as needed. For example, the guard interval determiner section F6 is referred to as the GI determiner section F6; the duration time of the guard interval is referred to as the GI duration time. Here, GI is an abbreviation for Guard Interval.

The duration time of the guard interval is equivalent to a transmission prohibition duration time; the GI determiner section F6 is equivalent to the transmission prohibition-time adjuster section (which is also referred to as the transmission prohibition-time adjuster).

In detail, this GI determiner section F6 determines that the GI duration time is a predetermined first duration time Ta, as in FIG. 8, when the error assessor section F5 assesses the error amount to be small. The first duration time Ta may have a time length (for example, 2 milliseconds) comparable with a GI duration time in a conventional configuration, for example. Note that the first duration time Ta only needs to be determined according to a duration time of the communication zone (50 milliseconds in the present embodiment), or may be equivalent to 1/25 or 1/50 of the communication time zone.

In contrast, the GI determiner section F6 determines that the GI duration time is a predetermined second duration time Tb when the error assessor section F5 assesses the error amount to be great. The second duration time Tb only needs to be longer than the first duration time Ta, and may be suitably designed depending on the time length of the communication time zone. As an example in the present embodiment, the second duration time Tb is set to 6 milliseconds, but may be a duration time equivalent to 1/10, 1/5, or 1/3 of the communication time zone. It is noted that the second duration time Tb is defined as being shorter than the duration time acquired by dividing the duration time of the communication time zone by 2 (two).

In addition, the second duration time Tb is preferably set such that one transmission of a data is executable in the duration time acquired from subtracting twice the second duration time Tb from the duration time of the communication time zone.

Figure 9:
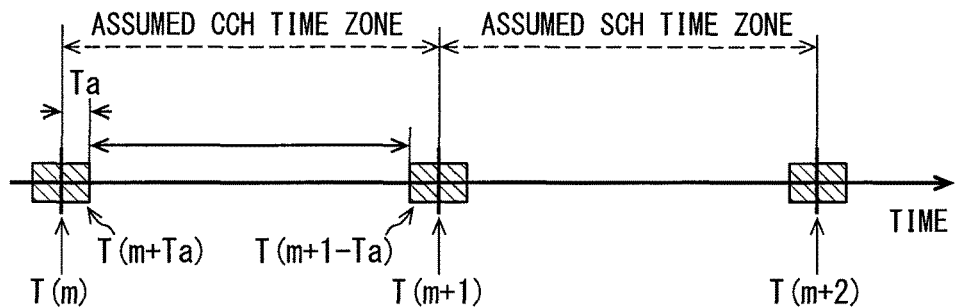
FIG. 9 is a diagram for explaining an operation of a GI determiner section.

FIG. 9 is a schematic diagram illustrating a relation between the communication time zone and the guard interval when the first duration time Ta is employed as the GI duration time by the GI determiner section F6. In FIG. 9, T (m), T (m+1), and T (m+2) each represent a clock time corresponding to the point of time identified by the time zone determiner section F21.

The clock time T (m+Ta) represents a clock time when the first duration time Ta elapses since the clock time T (m); the clock time T (m+1−Ta) represents a clock time since which the first duration time Ta elapses to thereby reach the clock time T (m+1) corresponding to the switching point of time. In other words, the clock time T (m+1−Ta) represents a clock time earlier, by the first duration time Ta, than the clock time T (m+1) corresponding to the switching point of time.

Figure 10:
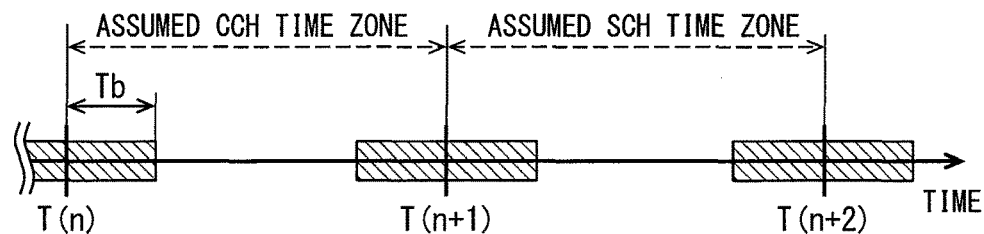
FIG. 10 is a diagram for explaining an operation of a GI determiner section.

Further, when the error assessor section F5 assesses the error amount to be great, the guard interval is continued for a duration time longer than that when the error assessor section F5 assesses the error amount to be small. In FIG. 10, T (n), T (n+1), and T (n+2) each represent a clock time corresponding to the point of time identified by the time zone determiner section F21.

<Relating to Configuration of Transmission and Reception Processor Section F2>

Figure 11:
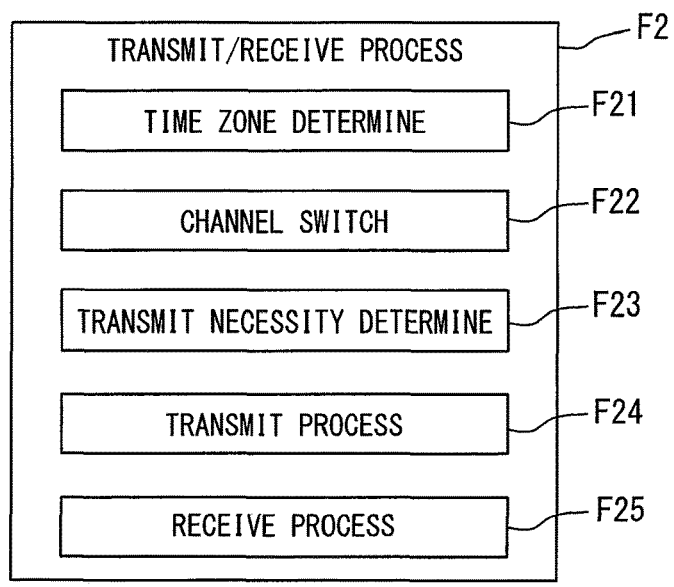
FIG. 11 is a diagram illustrating an example of a schematic configuration of a communication processor section.

The following explains a configuration of the transmission and reception processor section F2. The transmission and reception processor section F2 includes a time zone determiner section F21, a channel switch section F22, a transmission necessity determiner section F23, a transmission processor section F24, and a reception processor section F25 (which are also referred to as a time zone determiner F21, a channel switch F22, a transmission necessity determiner F23, a transmission processor F24, and a reception processor F25), as indicated in FIG. 11 as detailed functional blocks. These functional blocks may be achieved in a hardware manner using one or more ICs like other functional blocks.

The time zone determiner section F21 identifies the switching point of time at which the communication time zones are switched based on the vehicular clock time held in the time holder section F1, while determining whether the current communication time zone is the CCH time zone or the SCH time zone based on the vehicular clock time held by the time holder section F1.

For convenience, the time zone determined by the time zone determiner section F21 to be the CCH time zone is called the assumed CCH time zone; the time zone determined by the time zone determiner section F21 to be the SCH time zone is called the assumed SCH time zone. The reason for distinguishing the names is because the switching points of time for the communication time zones, which are determined by the time zone determiner section F21 based on the vehicular clock time, may be possibly deviated from the actual CCH time zone or the actual SCH time zone.

The channel switch section F22 switches the communication-target channel according to the channel control mode indicated from the in-vehicle control circuit 21. In detail, when the channel holding mode is indicated, the state where the indicated communication channel is continuously designated as the communication-target channel until the indication is cancelled or until the term of validity of the indication becomes invalid.

In addition, when the channel alternating mode is indicated, the communication-target channel is switched at the switching point of time identified by the time zone determiner section F21. For example, when the current zone is the CCH time zone, the control channel is designated as the communication-target channel. In addition, at the switching point of time when the CCH time zone is switched into the SCH time zone, the communication-target channel is switched from the control channel into the service channel indicated from the in-vehicle control circuit 21.

The transmission necessity determiner section F23 determines whether the current time is the time at which the data transmission is available, based on the vehicular clock time held by the time holder section F1, the switching point of time identified by the time zone determiner section F21, and the GI duration time determined by the GI determiner section F6. The time at which the data transmission is available corresponds to the time outside of the guard interval. For example, in FIG. 9, the time at which the data transmission is available is from the clock time T (m+Ta) to the clock time T (m+1−Ta).

The transmission processor section F24 outputs the transmission data inputted from the in-vehicle control circuit 21 to the modulator and demodulator 232 to transmit when the transmission-necessity determiner section F23 determines that the current time is the time at which the transmission is available. Note that whether to transmit the transmission data may be determined based on the result from a known carrier sense process as well as the determination result by the transmission necessity determiner F23. The data that is under a transmission ready state due to the determination result by the transmission necessity determiner F23 may be stored temporarily in the RAM 2342.

The reception processor section F25 acquires the reception data inputted from the modulator and demodulator 232, and provides it to the in-vehicle control circuit 21.

Summary of Embodiment

Under the above configuration, the error assessor section F5 assesses an error amount of the vehicular clock time against the reference clock time; the GI determiner section F6 determines a GI duration time according to the assessment result of the error assessor section F5. In detail, when assessing the error amount to be great, the error assessor section F5 selects, as the GI duration time, the second duration time Tb longer than the first duration time Ta that is selected when assessing the error amount to be small.

Figure 12:
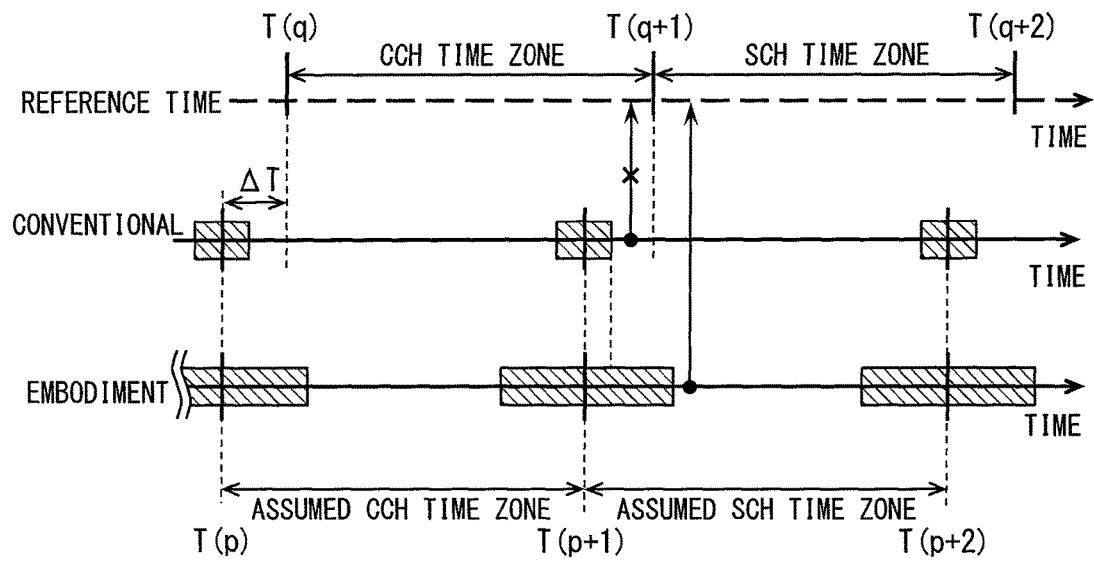
FIG. 12 is a diagram for explaining an operation and an effect according to an embodiment.

Such configuration provides effects described using FIG. 12. FIG. 12 is a diagram comparing an operation of the present embodiment with a conventional configuration in cases where the vehicular clock time is equal to or greater than the first duration time Ta fast against the reference clock time. Under the conventional configuration, the GI duration time is fixed to the same time length as the first duration time Ta.

In FIG. 12, clock times T(p), T(p+1), and T(p+2) each represent the switching point of time identified by the time zone determiner section F21. In addition, the clock times T(q), T(q+1), and T (q+2) each represent the switching point of time based on the reference clock time. ΔT represents an amount of time difference of the vehicular clock time against the reference clock time.

The time zone determiner section F21 determines that the CCH time zone is from the clock time T(p) to the clock time T(p+1), while determining that the SCH time zone is from the clock time T(p+1) to the clock time T(p+2). In actuality, the CCH time zone is from the clock time T(q) to the clock time T(q+1); the SCH time zone is from the clock time T(q+1) to the clock time T(q+2).

Under this assumed situation, suppose a case that a data transmission is performed by the in-vehicle device 2 immediately after the guard interval beginning with the start of the SCH time zone expires. Under such a case, operations will be compared between the conventional configuration and the present embodiment.

First, an operation of the conventional configuration will be described. In the conventional configuration, the GI duration time is equivalent to the first duration time Ta. Under the above assumed situation, the GI duration time is smaller than the amount of time difference ΔT against the reference clock time. Immediately after the guard interval beginning with the start of the SCH time zone expires, the true communication time zone is thus still the CCH time zone. Therefore, immediately after the guard interval beginning with the start of the SCH time zone expires, there is a possibility that the communication devices in the vicinity are still designating the control channel as the communication-target channel.

As a result, even if the in-vehicle device in the conventional configuration performs a data transmission immediately after the guard interval beginning with the start of the SCH time zone expires, the transmitted data may not be received due to the mismatching in the communication-target channels.

By contrast, in the present embodiment, when assessing the error amount to be great, the error assessor section F5 employs the second duration time Tb as the GI duration time. If the second duration time Tb is employed as the GI duration time, there is a high possibility that the true communication time zone has also transitioned into the SCH time zone immediately after the guard interval beginning with the start of the SCH time zone expires, as in the lower part in FIG. 12. Therefore, at the point of time when the data transmission is performed using the service channel, there is a possibility that the communication devices in the vicinity are also designating, as the communication-target channel, the service channel allowing the reception of the data.

As compared with the conventional configuration, the present embodiment can reduce a possibility that the transmitted data may not be received due to the mismatching in the communication-target channels.

Incidentally, when the synchronization process based on a PPS signal can be executed within a fixed duration time since the current time, the amount of time difference ΔT against the reference clock time may be expected to be smaller than the first duration time Ta. In an opposite way, the case where the amount of time difference ΔT against the reference clock time exceeds the first duration time Ta includes the case where a synchronization process based on a PPS signal has not been executed a fixed duration time or longer. Further, the case where the error amount is assessed to be great by the error assessor section F5 includes the case where a synchronization process based on a PPS signal will not been executed a fixed duration time from the current time.

That is, in the case where the amount of time difference ΔT against the reference clock time exceeds the first duration time Ta, the error amount is expected to be great by the error assessor section F5. That is, in the case where the amount of time difference ΔT against the reference clock time exceeds the first duration time Ta, there is a high possibility that the second duration time is employed as the GI duration time. As a result, the present embodiment can provide the above-mentioned effect as compared with the comparative conventional configuration.

In addition, the guard interval is arranged not only immediately after the switching point of time but just before the switching point of time. Therefore, also when the vehicular clock time is equal to or greater than the first duration time Ta slow against the reference clock time, the present embodiment can reduce a possibility that the transmitted data may not be received by a communication device of a receiving end due to the mismatching with the communication device of the receiving end in the communication-target channel.

The case where the error amount of the vehicular clock time against the reference clock time increases signifies the situation continuing where the synchronization process using a PPS signal or TA frame has not been executed. For example, when the vehicle runs a tunnel in which the roadside device 1 is not installed, the GNSS receiver 22 failing to receive the radio wave from the GNSS satellite cannot thus output any PPS signal. This continues the situation where the synchronization process using a PPS signal or TA frame has not been executed.

As such the accuracy of the vehicular clock time in each vehicle in a tunnel depends on the clock generator 233 installed in each vehicle, causing the variation in the vehicular clock time held by each vehicle. The communication-target channels of vehicles may thus not match with each other immediately before and immediately after the switching point of time even if the vehicles start to execute vehicle-to-vehicle communication using a service channel.

According to the present embodiment, the GI duration time is set to be relatively longer in the situation, such as in a tunnel, where the vehicular clock times of the vehicles tend to vary from each other. This can reduce a possibility that communication fails due to the mismatching in the communication-target channels of respective vehicles.

In addition, when the GNSS receiver 22 captures the radio wave from the GNSS satellite, the error amount is assumed to be small; the GI duration time is thereby set to a relatively small value. This can secure a sufficient time for transmitting a data.

The embodiment of the present disclosure is described in the above; however, the present disclosure is not limited to the above embodiment. The following modification examples are also included in a technical scope of the present disclosure; furthermore, another modification other than the following is also executable as long as not deviating from a subject matter.

First Modification Example

The GI determiner section F6 may lengthen the GI duration time depending on the elapsed time since the last execution of a synchronization process. It is because more error is accumulated depending on the accuracy of the clock generator 233 as the elapsed time since the last execution of the synchronization process becomes longer.

For example, first, the GI determiner section F6 specifies a GI duration time depending on the error amount assessed by the error assessor section F5 based on the kind of the synchronization information of a synchronization process that was executed. Then, as in FIG. 13, such specified GI duration time is maintained unchanged for a predetermined holding duration time Thld after the execution of the synchronization process.

Figure 13:
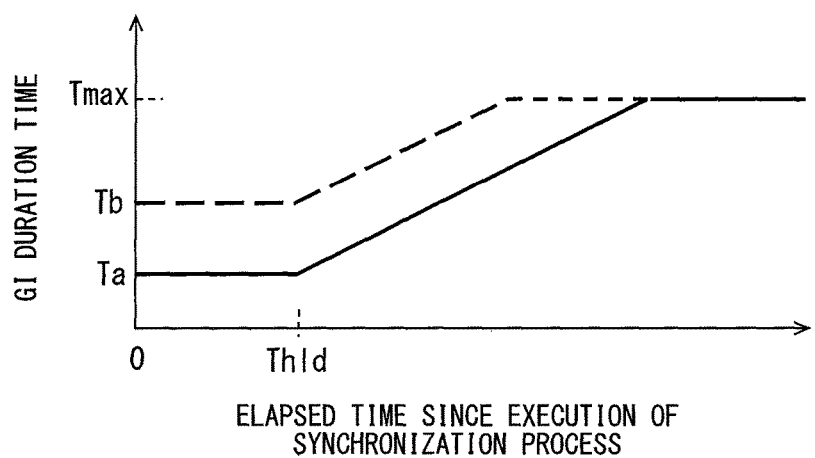
FIG. 13 is a diagram for explaining an operation of a GI determiner section according to a first modification example.

The solid line in FIG. 13 illustrates the time-based trend of the GI duration time when the error amount (hereinafter, the initial error amount) in the vehicular clock time acquired as a result of the synchronization process is assessed to be small by the error assessor section F5. In contrast, the broken line illustrates the time-based trend of the GI duration time when the initial error amount is assessed to be great.

The holding duration time Thld for which the GI duration time according to the initial error amount is maintained unchanged may be set as a time interval with which the synchronization information is acquired. For example, when the vehicle is present in the environment allowing the acquisition of a PPS signal or TA frame, the PPS signal or TA frame can be acquired each second. The holding duration time Thld may be set to one second.

In addition, after the holding duration time Thld elapses since the execution of the synchronization process, the GI duration time is increased monotonically according to the exceeded duration time up to a predetermined upper limit Tmax. Although being able to be designed suitably, the upper limit Tmax may be preferable to be set as follows. That is, at least one data transmission needs to be executed for a duration time that is obtained by subtracting twice the upper limit Tmax from the duration time of the communication time zone. For instance, the upper limit Tmax may be preferably set to be equivalent to ⅓ of the duration time of the communication time zone.

The above configuration can employ the GI duration time according to not only the kind of the synchronization process but also the elapsed time after the last execution of the synchronization process. This can further reduce a possibility of the failure in the communication due to the error in the clock time held by a communication device.

The above exemplifies, but not be limited to, a configuration that maintains the GI duration time constant until the holding duration time Thld elapses since the execution of the synchronization process. Another configuration may be provided without using the concept of the holding duration time Thld; namely, the GI duration time is increased monotonically up to the upper limit Tmax depending on the elapsed time since the execution of the synchronization process.

In addition, FIG. 13 exemplifies, but not be limited to, a configuration that increases the GI duration time with a constant slope depending on the elapsed time, up to the upper limit Tmax. Another configuration may be provided that determines the GI duration time using an exponential function, a logarithmic function, or a quadratic function with the elapsed time be a variable. Furthermore, the GI duration time may be increased in a step-wise manner.

In addition, the above exemplifies, but not be limited to, a configuration permitting the GI determiner section F6 to adjust directly the GI duration time depending on the elapsed time since the immediately previous execution of the synchronization process. Another configuration may be provided where the error assessor section F5 updates successively the assessment of the error amount depending on the elapsed time since the immediately previous execution of the synchronization process, and the GI determiner section F6 employs the GI duration time according to the error amount updated successively.

In this case, the error assessor section F5 assesses the error amount to be greater as the elapsed time after the immediately previous execution of the synchronization process is longer. The error amount may be represented with a linear numerical value, or levels predetermined in a step-wise manner. The GI determiner section F6 thereby lengthens the GI duration time as the error amount assessed by the error assessor section F5 increases.

Second Modification Example

The above exemplifies, not be limited to, a configuration that assesses the error amount depending on the kind of the synchronization information. Another configuration may be provided where the error assessor section F5 assesses the error amount to be relatively small immediately after the execution of the synchronization process regardless of the kind of the synchronization information, whereas assessing the error amount to be increased according to the elapsed time since the execution of the synchronization process. That is, the method for assessing the error amount needs not to use the kind of the synchronization information.

Third Modification Example

The GI determiner section F6 may determine the GI duration time depending on an importance of a data that will be transmitted as well as the error amount assessed by the error assessor section F5. The GI duration time is longer as the importance of the data which will be transmitted is higher. That is, the GI determiner section F6 in the third modification may specify tentatively a GI duration time depending on the error amount assessed by the error assessor section F5, and then lengthens the tentatively specified GI duration time as the importance of the data which will be transmitted is higher.

Figure 14:
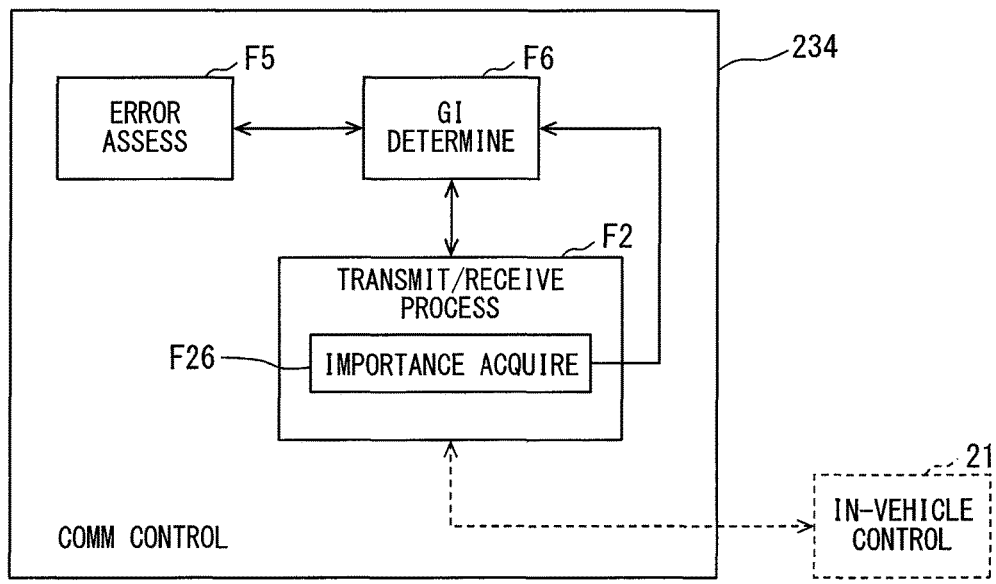
FIG. 14 is a diagram for explaining an operation of a GI determiner section according to a third modification example.

For instance, the third modification example may be achieved as follows. First, the transmission and reception processor section F2 includes an importance acquirer section F26 (which is also referred to as an importance acquirer 26) illustrated in FIG. 14. The importance acquirer section F26 may be achieved by CPU executing a predetermined program or by a hardware manner using one or more ICs. Note that FIG. 14 omits illustrating of the components unrelated to the GI determiner section F6 determining the GI duration time.

The importance acquirer section F26 acquires an importance of the data for transmission inputted from the in-vehicle control circuit 21. The importance of the data may be indicated from the in-vehicle control circuit 21. The in-vehicle control circuit 21 also provides the in-vehicle WAVE communicator 23 with the importance as well as the data for transmission. The importance of the data only needs to be predetermined depending on the kind of the data. The data indicating the importance for each kind of data may be stored in the ROM 213.

Further, another configuration may be provided where the data indicating the importance for each kind of data is registered in the ROM 2343, and the importance acquirer section F26 specifies the importance of the data for transmission inputted from the in-vehicle control circuit 21.

Further, the importance acquirer section F26 notifies the GI determiner section F6 of the importance of the data which the transmission processor section F24 is going to transmit. The GI determiner section F6 then determines the GI duration time depending on the importance of the data that will be transmitted as well as the error amount assessed by the error assessor section F5. The transmission necessity determiner section F23 determines the necessity of the transmission based on the GI duration time determined by the GI determiner section F6.

Such configuration lengthens the GI duration time when transmitting the data with a relatively high importance (hereinafter, important data). This allows the important data to be transmitted in an intermediate portion of the communication time zone determined by the time zone determiner section F21. This is because the transmission before and after the switching point of time is prohibited due to the guard intervals. Naturally, the transmission in an intermediate portion of the communication time zone reduces a possibility of mismatching in the communication-target channels between a receiving end and a host vehicle.

That is, the GI duration time is lengthened as the importance of the data which will be transmitted is higher. This increases a possibility that the important data will be received by the communication device of the receiving end. Further, the third modification example may be combined with the first modification example or the second modification example.

Fourth Modification Example

The above exemplifies, but not be limited to, a configuration permitting the time zone determiner section F21 to identify the switching point of time based on the clock time information amended using the TA frame or the PPS signal. The switching point of time may be identified based on whether a different vehicle is executing the communication using the service channel. When the communication using the service channel is being executed in the different vehicle, the corresponding time zone is expected to be the SCH time zone.

Identifying the switching point of time is equivalent to executing a process that accords the vehicular clock time with the reference clock time. That is, the information (hereinafter, SCH-used information) which indicates whether the communication using the service channel is executed in a different vehicle is also equivalent to an example of the synchronization information.

For example, the in-vehicle device 2 in the fourth modification example may be provided as follows. Note that there is a premise that a service channel for vehicle-to-vehicle communication (hereinafter, vehicle-to-vehicle communication-used channel) is predetermined among a plurality of service channels. In addition, there is another premise that the in-vehicle WAVE communicator 23 employs, as the channel control mode, the channel holding mode that designates, as the communication-target channel, the control channel in an initial state immediately after an ignition power source (hereinafter, IG power) is turned on.

Under the above premises, the in-vehicle control circuit 21 instructs the in-vehicle WAVE communicator 23 to designate, as the channel control mode, the channel alternating mode at the point of time when a fixed duration time elapses since the IG power is turned on. This fixed duration time may be suitably designed, e.g., 30 seconds.

Note that if the synchronization process is executed in the in-vehicle WAVE communicator 23 before a fixed duration time elapses since the IG power is turned on, the output of the instruction about the channel control mode based on that a fixed duration time elapses since the IG power is turned on will be cancelled.

The channel switch section F22 switches the channel control mode from the channel holding mode to the channel alternating mode also based on the instruction from the in-vehicle control circuit 21. In this case, the service channel to which the control channel is switched is supposed to be the above vehicle-to-vehicle communication-used channel among the service channels.

Further, when a different vehicle is present around the host vehicle, the transmission and reception processor section F2 receives the data transmitted from the different vehicle while designating, as the communication-target channel, the vehicle-to-vehicle communication-used channel. Upon receipt of the data from the different vehicle, the transmission and reception processor section F2 notify the synchronization information acquirer section F3 of the receipt of the data. This allows the synchronization information acquirer section F3 to acquire, as the synchronization information, the information indicating that a different vehicle is executing the communication using the service channel.

Figure 15:
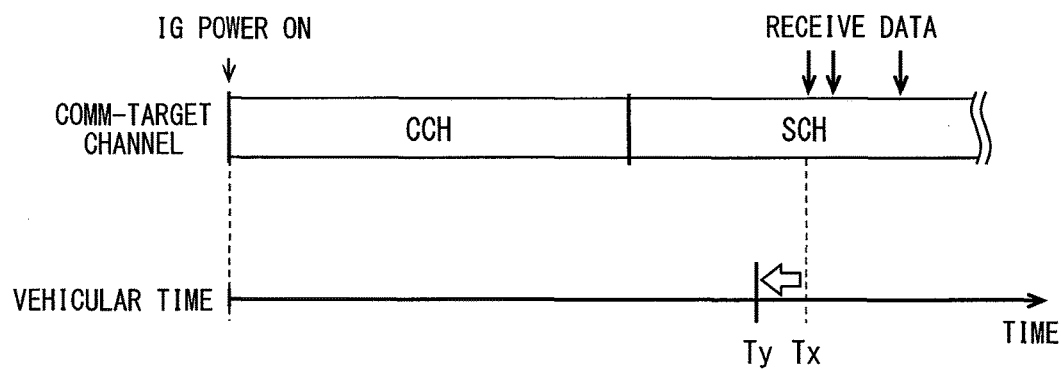
FIG. 15 is a diagram for explaining an operation of a time amender section according to a fourth modification example.

The time amender section F4 determines that the current clock time at least corresponds to the SCH time zone from the fact that the different vehicle is executing the communication using the service channel. Further, in FIG. 15, the point of time Tx is defined as a point of time when the data is acquired first from the different vehicle after the vehicle-to-vehicle communication-used channel is designated as the communication-target channel; the point of time Ty is defined as a point of time that is earlier than the point of time Tx by the GI duration time. The time amender section F4 regards the clock time Ty as the switching point of time when the CCH time zone transitions into the SCH time zone. The GI duration time may be the first duration time Ta.

The time amender section F4 then amends the vehicular clock time so as to accord the clock time Ty with the switching point of time when the CCH time zone is switched to the SCH time zone.

Such a configuration allows the prompt start of the vehicle-to-vehicle communication in the situation where the in-vehicle device 2 cannot yet execute the synchronization process based on a PPS signal or a TA frame such as a situation immediately after the ignition power of the vehicle is turned on. However, the data transmission may be preferably not to be executed until the synchronization process is executed based on the PPS signal or the TA frame. This is because the error amount is assumed to be great.

The present fourth modification example exemplifies, but not be limited to, a configuration that regards the point of time that is earlier by the GI duration time than the point of time Tx when the different vehicle starts the vehicle-to-vehicle communication as the point of time when the CCH time zone transitions to the SCH time zone. The point of time Tx when the different vehicle starts the vehicle-to-vehicle communication may be regarded as the switching point of time when the CCH time zone transitions to the SCH time zone.

Fifth Modification Example

The above exemplifies, but not be limited to, a configuration that changes and employs dynamically the GI duration time in the in-vehicle device 2. The similar configuration may be applied to the roadside device 1. That is, the communication device described in claims may be not only the in-vehicle device 2 but also the roadside device 1.

Sixth Modification Example

The above exemplifies, but not be limited to, the in-vehicle device 2 or the roadside device 1 as a communication device which executes the WAVE communication. The communication device which executes the WAVE communication may include a communication device (hereinafter, portable terminal) carried by pedestrians. In addition, such a portable terminal may dynamically change and employ the GI duration time like the above-mentioned in-vehicle device 2. That is, the communication device described in claims may be a portable terminal.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A communication device that is one of a plurality of communication devices used in a mobile communication system, the communication devices performing direct wireless communication using a control channel and a service channel among communication channels that are achieved with mutually different frequencies, wherein two communication time zones of a control channel time zone and a service channel time zone are alternately switched, the control channel time zone where communication is performed using the control channel, the service channel time zone where communication is performed using the service channel, the communication device comprising:

a time holder section that holds a clock time at present based on a clock signal outputted successively from a clock generator;

a synchronization information acquirer section that acquires synchronization information used to synchronize the clock time held in the time holder section with a predetermined reference clock time;

a time amender section that performs amendment that amends the clock time held in the time holder section to decrease an error between the clock time held in the time holder section and the reference clock time based on the synchronization information;

a time zone determiner section that identifies a switching point of time at which the communication time zones are switched based on the clock time held in the time holder section, while determining whether the communication time zones are switched based on the switching point of time and the clock time held in the time holder section;

a channel switching section that designates a communication-target channel being a channel for a communication target by switching the communication time zones at the switching time identified by the time zone determiner section;

a transmission processor section that performs a data transmission using the communication-target channel designated by the channel switching section, and prohibits data transmission from being performed for a predetermined transmission prohibition duration time before and after the switching point of time;

an error assessor section that assesses an error amount being a degree of the error between the clock time held in the time holder section and the reference clock time; and a transmission prohibition-time adjuster section that adjusts the transmission prohibition duration time depending on the error amount assessed by the error assessor section, wherein the transmission prohibition-time adjuster section increases the transmission prohibition duration time as the error amount assessed by the error assessor section increases.

2. The communication device according to claim 1, wherein:

the synchronization information acquirer section acquires a plurality of kinds of the synchronization information, the kinds being mutually different in accuracy against the reference clock time; and the error assessor section assesses the error amount depending on the kind of the synchronization information used when the time amender section performs last amendment, which is performed most recently.

3. The communication device according to claim 2, further comprising:

a positioning radio receiver that receives radio waves transmitted from a positioning satellite in global navigation satellite system; and a reception processor section that receives a timing advertisement signal that advertises a switching point of time at which seconds are switched in the reference clock time, the timing advertisement signal being transmitted from a different communication device in the mobile communication system, wherein:

the synchronization information acquirer section acquires, as the synchronization information, the timing advertisement signal and reference timing information that indicates a switching point of time at which seconds are switched in the reference clock time, the reference timing information being acquired as a result of positioning computation using radio waves received by the positioning radio receiver; and the error assessor section assesses the error amount depending on the synchronization information uses in the last amendment performed by the time amender section, such that the error amount when the reference timing information is used as the synchronization information is smaller than the error amount when the timing advertisement signal is used as the synchronization information.

4. The communication device according to claim 1, further comprising:

an importance acquirer section that acquires an importance of a data that the transmission processor section is going to transmit, wherein the transmission prohibition-time adjuster section increases the transmission prohibition time as the importance becomes higher.

5. The communication device according to claim 1, wherein the error assessor section assesses the error amount to be greater as an elapsed time since the time amender section performs last amendment that is performed most recently increases.

6. The communication device according to claim 1, wherein:

the synchronization information acquirer section acquires, as the synchronization information, an event of a different communication device starting communication using the service channel among the communication devices; and the time amender section identifies a switching point of time at which the communication time zone is switched from the control channel time zone into the service channel time zone based on a point of time at which the different communication device starts the communication using the service channel, amending the clock time held by the time holder section.

7. A communication device that is one of a plurality of communication devices used in a mobile communication system, the communication devices performing direct wireless communication using a control channel and a service channel among communication channels that are achieved with mutually different frequencies, wherein two communication time zones of a control channel time zone and a service channel time zone are alternately switched, the control channel time zone where communication is performed using the control channel, the service channel time zone where communication is performed using the service channel, the communication device comprising at least one communication control circuit that:

holds a clock time at present based on a clock signal outputted successively from a clock generator unit;

acquires synchronization information used to synchronize the held clock time with a predetermined reference clock time;
performs amendment that amends the held clock time to decrease an error between the held clock time and the reference clock time based on the synchronization information;
identifies a switching point of time at which the communication time zones are switched based on the held clock time, and determines whether the communication time zones are switched based on the switching point of time and the held clock time;
designates a communication-target channel being a channel for a communication target by switching the communication time zones at the switching time identified;
performs a data transmission using the designated communication-target channel, while prohibiting data transmission from being performed for a predetermined transmission prohibition duration time before and after the switching point of time;
assesses an error amount being a degree of the error between the held clock time and the reference clock time; and
adjusts the transmission prohibition duration time depending on the error amount assessed,
wherein
the communication control circuit increases the transmission prohibition duration time as the assessed error amount increases.

8. The communication device according to claim 7, wherein:
the communication control circuit acquires a plurality of kinds of the synchronization information, the kinds being mutually different in accuracy against the reference clock time; and
the communication control circuit assesses the error amount depending on the kind of the synchronization information used when last amendment is performed most recently.

9. The communication device according to claim 8, further comprising:
a positioning radio receiver that receives radio waves transmitted from a positioning satellite in global navigation satellite system,
wherein:
the communication control circuit further receives a timing advertisement signal that advertises a switching point of time at which seconds are switched in the reference clock time, the timing advertisement signal being transmitted from a different communication device in the mobile communication system;
the communication control circuit acquires, as the synchronization information, the timing advertisement signal and reference timing information that indicates a switching point of time at which seconds are switched in the reference clock time, the reference timing information being acquired as a result of positioning computation using radio waves received by the positioning radio receiver; and
the communication control circuit assesses the error amount depending on the synchronization information used in the last amendment, such that the error amount when the reference timing information is used as the synchronization information is smaller than the error amount when the timing advertisement signal is used as the synchronization information.

10. The communication device according to claim 7, wherein:
the communication control circuit further acquires an importance of a data that is going to be transmitted; and
the communication control circuit increases the transmission prohibition time as the importance becomes higher.

11. The communication device according to claim 7, wherein
the communication control circuit assesses the error amount to be greater as an elapsed time increases, the elapsed time being since last amendment that is performed most recently.

12. The communication device according to claim 7, wherein:
the communication control circuit acquires, as the synchronization information, an event of a different communication device starting communication using the service channel among the communication devices; and
the communication control circuit identifies a switching point of time at which the communication time zone is switched from the control channel time zone into the service channel time zone based on a point of time at which the different communication device starts the communication using the service channel, amending the held clock time.

13. The communication device according to claim 7, wherein
an individual communication control circuit of the at least one communication control circuit includes at least one of (i) a hardware circuit; and (ii) a central processing unit and a memory storing instructions for the central processing unit.

* * * * *